(12) United States Patent
Hellgren (10) Patent No.: US 12,103,079 B2
(45) Date of Patent: Oct. 1, 2024

(54) METHOD AND APPARATUS FOR PROVIDING ILLUMINATION IN AN ADDITIVE MANUFACTURING PROCESS

(71) Applicant: Arcam AB, Mölndal (SE)

(72) Inventor: Jonas Hellgren, Savedalen (SE)

(73) Assignee: Arcam AB, Mölnlycke (SE)

( * ) Notice: Subject to any disclaimer, the term of this patent is extended or adjusted under 35 U.S.C. 154(b) by 654 days.

(21) Appl. No.: 17/416,185

(22) PCT Filed: Mar. 4, 2019

(86) PCT No.: PCT/EP2019/055344
§ 371 (c)(1),
(2) Date: Jun. 18, 2021

(87) PCT Pub. No.: WO2020/126112
PCT Pub. Date: Jun. 25, 2020

(65) Prior Publication Data
US 2022/0143744 A1 May 12, 2022

Related U.S. Application Data

(60) Provisional application No. 62/783,796, filed on Dec. 21, 2018.

(51) Int. Cl.
*B22F 12/49* (2021.01)
*B22F 10/28* (2021.01)
(Continued)

(52) U.S. Cl.
CPC .............. *B22F 12/49* (2021.01); *B22F 10/28* (2021.01); *B22F 10/366* (2021.01);
(Continued)

(58) Field of Classification Search
CPC ........ B22F 12/49; B22F 10/28; B22F 10/366; B22F 10/85; B22F 12/90; B23K 26/032;
(Continued)

(56) References Cited

U.S. PATENT DOCUMENTS

2016/0054347 A1* 2/2016 Snis ..................... B23K 26/082
250/341.1

FOREIGN PATENT DOCUMENTS

| DE | 10 2016 222186 B3 | 4/2018 |
|---|---|---|
| JP | H08 134643 A | 5/1996 |
| WO | 2014/090510 A1 | 6/2014 |

OTHER PUBLICATIONS

International Search Report and Written Opinion for application PCT/EP2019/055344 mail date Jun. 25, 2020 (11 pages).

* cited by examiner

*Primary Examiner* — Robert G Bachner
(74) *Attorney, Agent, or Firm* — Dinsmore & Shohl LLP (57) ABSTRACT

An apparatus for forming at least one three-dimensional article through successive fusion of parts of a powder bed, which parts corresponds to successive cross sections of the three-dimensional article, the apparatus comprising: a powder distributor configured for evenly distributing a layer of powder on top of a work table provided inside a build chamber; and at least one high energy beam source emanating at least one high energy beam configured for fusing the powder layer in selected locations corresponding to the cross section of the three-dimensional article, wherein the apparatus further comprising at least one target area arranged spaced apart from the layer of powder for emanating light when irradiated by the at least one high energy beam.

20 Claims, 9 Drawing Sheets

(51) Int. Cl.
  *B22F 10/366* (2021.01)
  *B22F 10/85* (2021.01)
  *B22F 12/90* (2021.01)
  *B23K 26/03* (2006.01)
  *B23K 26/046* (2014.01)
  *B23K 26/06* (2014.01)
  *B23K 26/08* (2014.01)
  *B23K 26/082* (2014.01)
  *B33Y 10/00* (2015.01)
  *B33Y 30/00* (2015.01)
  *B33Y 50/02* (2015.01)
  *H04N 7/18* (2006.01)

(52) U.S. Cl.
  CPC .......... *B23K 26/032* (2013.01); *B23K 26/046* (2013.01); *B33Y 10/00* (2014.12); *B33Y 30/00* (2014.12); *B33Y 50/02* (2014.12); *H04N 7/18* (2013.01); *B22F 10/85* (2021.01); *B22F 12/90* (2021.01); *B23K 26/0665* (2013.01); *B23K 26/082* (2015.10); *B23K 26/083* (2013.01)

(58) Field of Classification Search
  CPC ............. B23K 26/046; B23K 26/0665; B23K 26/082; B23K 26/083; B33Y 10/00; B33Y 30/00; B33Y 50/02; B33Y 40/00; H04N 7/18; B29C 64/268; B29C 64/153; Y02P 10/25
  See application file for complete search history.

METHOD AND APPARATUS FOR PROVIDING ILLUMINATION IN AN ADDITIVE MANUFACTURING PROCESS

CROSS REFERENCE TO RELATED APPLICATIONS

This applications is a U.S. national phase of International Application No. PCT/EP2019/055344, filed Mar. 4, 2019, which claims priority to and the benefit of U.S. Provisional Patent Application No. 62/783,796, filed on Dec. 21, 2018, the contents of which are hereby incorporated by reference in their entirety.

BACKGROUND

Related Field

The present application relates to a method and an apparatus for providing illumination in an additive manufacturing process for forming at least one three-dimensional article by fusing powder layer by layer

Description of Related Art

Freeform fabrication or additive manufacturing is a method for forming three-dimensional articles through successive fusion of chosen parts of powder layers applied to a worktable.

Such an apparatus may comprise a work table on which the three-dimensional article is to be formed, a powder dispenser, arranged to lay down a thin layer of powder on the work table for the formation of a powder bed, an energy beam for delivering energy to the powder whereby fusion of the powder takes place, elements for control of the energy given off by the energy beam over the powder bed for the formation of a cross section of the three-dimensional article through fusion of parts of the powder bed, and a controlling computer, in which information is stored concerning consecutive cross sections of the three-dimensional article. A three-dimensional article is formed through consecutive fusions of consecutively formed cross sections of powder layers, successively laid down by the powder dispenser.

In various stage of the additive manufacturing process illumination may be needed in the process chamber. An additive manufacturing process may be harmful to an ordinary lamp, i.e., the optics of the lamp may be coated by vapor contamination resulting in a degraded lamp function over time and eventually a malfunctioning lamp.

One way of prohibiting contamination of the optics is to provide a gas flow in front of the optics in the additive manufacturing apparatus. The gas flow may not always be possible, for instance in an electron beam melting (EBM) additive manufacturing process where the manufacturing takes place in vacuum conditions.

Another solution may be to provide the lamp source out of sight of the vapor. A problem with this solution may be a relatively complex optical solution for providing a sufficient illumination. In view of the above and other considerations, there is thus a need in the art for an simple and effective method for illuminating the process surface such as the powder layer and/or the top surface of the three-dimensional article in an additive manufacturing process.

SUMMARY

An objective is to provide a method and an apparatus for illuminating a process surface in an additive manufacturing process forming three dimensional articles by fusing powder layer by layer which solves the above mentioned problems.

In a first aspect of the present disclosure the above mentioned object is achieved by the features of the apparatus claimed herein.

According to various embodiments, the present application provides an apparatus for forming at least one three-dimensional article through successive fusion of parts of a powder bed, which parts corresponds to successive cross sections of the three-dimensional article, the apparatus comprising: a powder distributor configured for evenly distributing a layer of powder on top of a work table provided inside a vacuum chamber; and at least one high energy beam source emanating at least one high energy beam configured for fusing the powder layer in selected locations corresponding to the cross section of the three-dimensional article, wherein: the apparatus further comprising at least one target area arranged spaced apart from the layer of powder for emanating light when irradiated by the at least one high energy beam.

An advantage of at least this example embodiment is that high energy beam may not only be used for heating and/or fusing the powder material for creating a three-dimensional article but also for irradiating a target area(s) for creating illumination at desired occasions in desired direction(s).

In various example embodiments of the present disclosure the target area is made of a phosphorescent material or a fluorescent material. An advantage of at least this example embodiment is that illumination may be generated more or less instantaneously as the beam is irradiating the target area. Another advantage is that the illumination may be switched oft in a controllable fashion by removing the irradiation from the target area.

In various example embodiments of the present disclosure the target area is made of material having a melt point above 1000° C. An advantage of at least this example embodiment is that the target area is more or less insensitive for overheating. Another advantage is that illumination may be present although the irradiation has been removed from the target area.

In various example embodiments of the present disclosure the target area is attached to the powder distributor or any other movable object. An advantage of at least this example embodiment is that an illumination source may be moved at different locations for illuminating different areas and/or in different directions.

In various example embodiments of the present disclosure the target area is attached inside of a heat shield provided between the powder layer and the at least one high energy beam source. An advantage of at least this example embodiment is that the heat shield not only functions as a heat shield and vapor shield for the manufacturing process but also as a carrier for the target area for creating illumination. Still another advantage is that the heat shield may form as an optical obstacle for a detector arranged outside the heat shield provided for capturing images of the manufacturing area of the manufacturing of the three-dimensional article.

In various example embodiments of the present disclosure the target area is fixed to a powder table, where the powder table is surrounding the manufacturing area of the three-dimensional article. An advantage of at least these embodiments is that the target area is arranged close to the area of interest, i.e., the manufacturing area of the three-dimensional article. In various example embodiments of the present disclosure the apparatus further comprising at least one detector for detecting the light reflected by the layer of powder or the fused powder layer or a viewport for human viewing. An advantage of at least these embodiments is that images of the working area, i.e., powder layer and/or the fused top surface of the three-dimensional article may be captured.

In various example embodiments of the present disclosure the apparatus further comprising an optical blocker for blocking light emanating directly from the target area onto the detector. An advantage of at least these embodiments is that the detector may be arranged more freely inside the additive manufacturing apparatus without risking receiving direct illumination from the target area.

In various example embodiments of the present disclosure the apparatus further comprising means for altering the size of the beam when irradiating the target for altering the intensity of the light emanating from the target area. An advantage of at least these example embodiments is that the illumination may easily be altered by changing the settings of at least one focus coil/lens and/or at least one astigmatism coil/lens.

In various example embodiments of the present disclosure the target area may have a surface which is flat, concave, convex or any suitable form depending on its location in the additive manufacturing apparatus for creating a desirable illumination.

In various example embodiments of the present disclosure a single target area comprises different sub areas made of different materials.

An advantage of at least these embodiments is that prolonged illumination after removing the irradiation and/or an instantaneous removal of the illumination as soon as the irradiation disappears from the target area may be chosen depending on which target area the at least one high energy beam is impinging, i.e., the illumination conditions may be chosen by irradiating different target areas by one and the same high energy beam source or by choosing multiple high energy beam sources, where one or more targets may be irradiated by one or more high energy beams emanating from one or more high energy beam sources. In another aspect of the present disclosure it is provided a method for illuminating a powder layer and/or a top surface of a three dimensional article in an additive manufacturing machine when forming a three-dimensional article layer by layer by successive fusion of selected areas of powder layers, which selected areas correspond to successive layers of the three-dimensional article, the method comprising the step of irradiating a high energy beam onto a target area spaced apart from the layer of powder for emanating light from the target area onto the powder layer and/or the top surface of the three-dimensional article.

In yet another aspect of the present disclosure it is provided a control unit for controlling an additive manufacturing machine for illuminating a powder layer and/or a top surface of a three-dimensional article in an additive manufacturing machine when forming a three-dimensional article layer by layer by successive fusion of selected areas of powder layers, which selected areas correspond to successive layers of the three-dimensional article, the control unit is configured for providing a high energy beam onto a target area spaced apart from the layer of powder for emanating light from the target area onto the powder layer and/or the top surface of the three-dimensional article.

In still another aspect of the present disclosure it is provided a computer program comprising program code means for performing a method for illuminating a powder layer and/or a top surface of a three dimensional article in an additive manufacturing machine when forming a three-dimensional article layer by layer by successive fusion of selected areas of powder layers, which selected areas correspond to successive layers of the three-dimensional article, the method comprising the step of irradiating a high energy beam onto a target area spaced apart from the layer of powder for emanating light from the target area onto the powder layer and/or the top surface of the three-dimensional article.

The above-listed embodiments and advantages thereof are provided as examples and are to be considered non-limiting in nature. Where advantages are highlighted with reference to a particular embodiment that should not be construed as that advantage applying only to that embodiment, as compared to others described.

BRIEF DESCRIPTION OF THE DRAWINGS

With reference to the appended drawings, below follows a more detailed description of embodiments of the disclosure cited as examples.

In the drawings.

DETAILED DESCRIPTION OF EXAMPLE EMBODIMENTS

Various embodiments of the present disclosure will now be described more fully hereinafter with reference to the accompanying drawings, in which some, but not all embodiments of the disclosure are shown. Indeed, embodiments of the disclosure may be embodied in many different forms and should not be construed as limited to the embodiments set forth herein. Rather, these embodiments are provided so that this disclosure will satisfy applicable legal requirements. Unless otherwise defined, all technical and scientific terms used herein have the same meaning as commonly known and understood by one of ordinary skill in the art to which the disclosure relates. The term "or" is used herein in both the alternative and conjunctive sense, unless otherwise indicated. Like numbers refer to like elements throughout.

Still further, to facilitate the understanding of this disclosure, a number of terms are defined below. Terms defined herein have meanings as commonly understood by a person of ordinary skill in the areas relevant to the present disclosure. Terms such as "a", "an" and "the" are not intended to refer to only a singular entity, but include the general class of which a specific example may be used for illustration. The terminology herein is used to describe specific embodiments of the disclosure, but their usage does not delimit the application, except as outlined in the claims.

The term "three-dimensional structures" and the like as used herein refer generally to intended or actually fabricated three-dimensional configurations (e.g., of structural material or materials) that are intended to be used for a particular purpose. Such structures, etc. may, for example, be designed with the aid of a three-dimensional CAD system, The term "electron beam" as used herein in various embodiments refers to any charged particle beam. The sources of charged particle beam can include an electron gun, a linear accelerator and so on.

Figure 3:
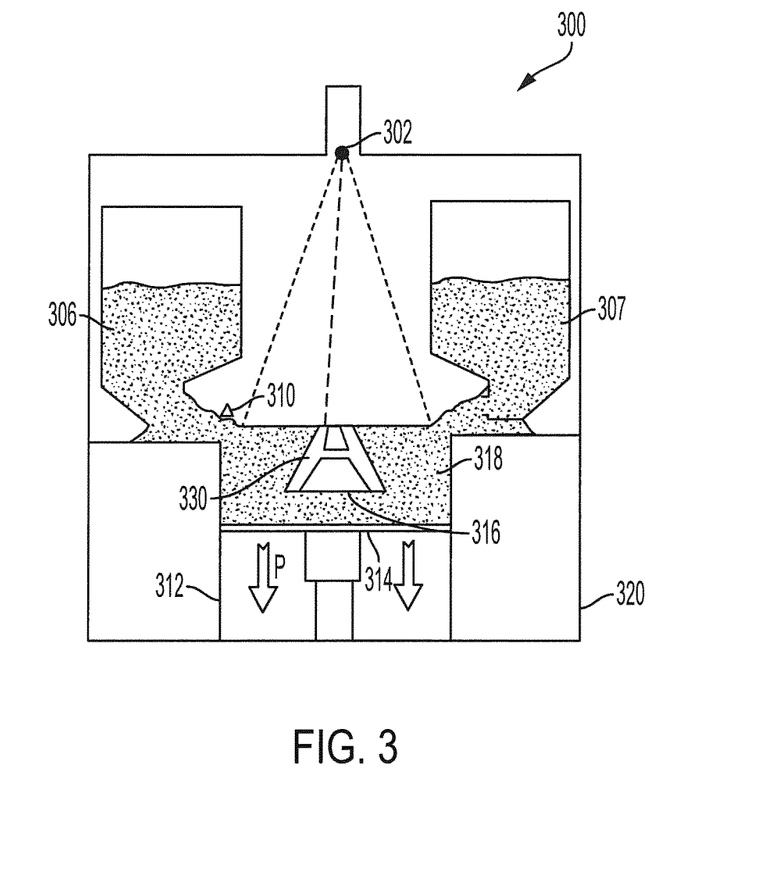
FIG. 3 depicts a schematic figure of an additive manufacturing apparatus in which the inventive device for providing illumination may be arranged.

FIG. 3 depicts an example embodiment of a freeform fabrication or additive manufacturing apparatus 300 in which the inventive illumination device 100 may be provided. The apparatus 300 comprising an electron gun 302; two powder hoppers 306, 307; a start plate 316; a build tank 312; a powder distributor 310; a build platform 314; and a vacuum chamber 320. The vacuum chamber 320 is capable of maintaining a vacuum environment by means of a vacuum system, which system may comprise a turbomolecular pump, a scroll pump, an ion pump and one or more valves which are well known to a skilled person in the art and therefore need no further explanation in this context. The vacuum system is controlled by a control unit.

The electron gun 302 is generating an electron beam which is used for melting or fusing together powder material 318 provided on the start plate 316. A control unit may be used for controlling and managing the electron beam emitted from the electron beam gun 302. At least one focusing coil (not shown), at least one deflection coil (not shown), an optional astigmatism coil (not shown) and an electron beam power supply (not shown) may be electrically connected to the control unit (not shown). In an example embodiment of the disclosure the electron gun 302 generates a focusable electron beam with an accelerating voltage of about 30-120 kV and with a beam power in the range of 0-1 OkW. The pressure in the vacuum chamber may be in the range of $1\times10^{-3}$-$1\times10^{-6}$ mBar when building the three-dimensional article by fusing the powder layer by layer with the energy beam.

The powder hoppers 306, 307 comprise the powder material to be provided on the start plate 316 in the build tank 312. The powder material may for instance be pure metals or metal alloys such as titanium, titanium alloys, aluminum, aluminum alloys, stainless steel, Co—Cr—W alloy, etc.

The powder distributor 310 is arranged to lay down a thin layer of the powder material on the start plate 316. During a work cycle the build platform 314 will be lowered successively in relation to the electron gun 302 after each added layer of powder material. In order to make this movement possible, the build platform 314 is in one embodiment of the disclosure arranged movably in vertical direction, i.e., in the direction indicated by arrow P. This means that the build platform 314 starts in an initial position, in which a first powder material layer of necessary thickness has been laid down on the start plate 316. The build platform is thereafter lowered in connection with laying down a new powder material layer for the formation of a new cross section of a three-dimensional article. Means for lowering the build platform 314 may for instance be through a servo engine equipped with a gear, adjusting screws etc.

A model of the three-dimensional article may be generated via a CAD (Computer Aided Design) tool.

In an example embodiment of a method according to the present disclosure for forming a three-dimensional article through successive fusion of parts of a powder bed, which parts corresponds to successive cross sections of the three-dimensional article, comprising a first step of distributing evenly a layer of powder on top of a work table 314 with a powder distributor 310.

Powder may be distributed evenly over the work table 314 according to several methods. One way to distribute the powder is to collect material fallen down from the hopper 306, 307 by a powder distributor 310. The powder distributor 310 is moved over the build tank 312 thereby distributing the powder over the work table 314 or in case where a start plate 316 is used over the start plate 316, The distance between a lower part of the powder distributor 310 and the upper part of the start plate 316 or previous powder layer determines the thickness of powder distributed over the start plate 316. The powder layer thickness can easily be adjusted by adjusting the height of the work table 314.

In a second step an electron beam is applied for fusing the layer of powder in selected locations corresponding to the cross section of the three-dimensional article. The electron beam may be directed over the start plate 316 causing the first powder layer to fuse in selected locations to form a first cross section of the three-dimensional article. The electron beam is directed over the start plate 316 from instructions given by a control unit (not shown), In the control unit instructions for how to control the electron beam gun for each layer of the three-dimensional article may be stored. After a first layer is finished, i.e., the fusion of powder material for making a first layer of the three-dimensional article, a second powder layer is provided on the start plate 316. The second powder layer may be distributed according to the same manner as the previous layer, However, there might be alternative methods in the same additive manufacturing machine for distributing powder onto the work table 314. For instance, a first layer may be provided by means of a first powder distributor, a second layer may be provided by another powder distributor. The design of the powder distributor is automatically changed according to instructions from the control unit. A powder distributor in the form of a single rake system, i.e., where one rake is catching powder fallen down from both a left powder hopper 306 and a right powder hopper 307, the rake as such can change design.

After having distributed the second powder layer on the start plate 316, the electron beam is directed over start plate 316 causing the second powder layer to fuse in selected locations to form a second cross section of the three-dimensional article 330. Fused portions in the second layer may be bonded to fused portions of the first layer. The fused portions in the first and second layer may be melted together by melting not only the powder in the uppermost layer but also remelting at least a fraction of a thickness of a layer directly below the uppermost layer.

It may be necessary to consider the charge distribution that is created in the powder as the electrons hit the powder bed 318, The charge distribution density depends on the following parameters: beam current, electron velocity (which is given by the accelerating voltage), beam scanning velocity, powder material and electrical conductivity of the powder, i.e. mainly the electrical conductivity between the powder grains. The latter is in turn a function of several parameters, such as temperature, degree of sintering and powder grain size/size distribution.

Thus, for a given powder, i.e. a powder of a certain material with a certain grain size distribution, and a given accelerating voltage, it is possible, by varying the beam current (and thus the beam power) and the beam scanning velocity, to affect the charge distribution. By varying these parameters in a controlled way, the electrical conductivity of the powder can gradually be increased by increasing the temperature of the powder. A powder that has a high temperature obtains a considerably higher conductivity which results in a lower density of the charge distribution since the charges quickly can diffuse over a large region. This effect is enhanced if the powder is allowed to be slightly sintered during the pre-heating process. When the conductivity has become sufficiently high, the powder can be fused together, i.e. melted or fully sintered, with predetermined values of the beam current and beam scanning velocity.

Figure 1A:
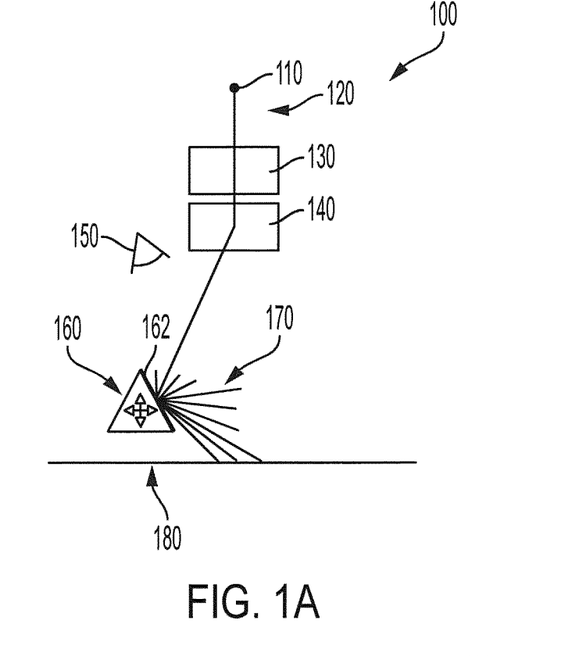
FIGS. 1A-1G depict schematic side views of various example embodiments of a device for providing illumination in an additive manufacturing apparatus according to the present application.

FIG. 1A depicts a schematic side view of a first example embodiment of a device 100 for providing illumination in an additive manufacturing apparatus according to the present disclosure. The device 100 comprising an electron beam source 110, a beam shaping arrangement 130, a beam deflection arrangement 140, a movable target area 160 and a surface 180. The electron beam source may be a single unit as depicted in FIG. 1A or plurality of units. In case of a single electron beam source an electron beam 120 emanating from the electron beam source is both used for forming the three dimension article and for creating illumination in the additive manufacturing apparatus. In case of multiple electron beam sources at least one electron beam source may be used for forming the three-dimensional article and at least one electron beam source may be used for creating the illumination inside the additive manufacturing apparatus. The electron beam source for creating illumination may be a separate source compared to the electron beam source for fusing the powder material. The electron beam 120 may pass through at least one beam shaping arrangement 130 and at least one beam deflecting arrangement before impinging on the substrate 180 or the target area 162. The beam shaping arrangement 130 may be one or a plurality of electromagnetic coils for changing the size and/or shape of the electron beam 120. The beam deflecting arrangement 140 may be one or a plurality of electromagnetic coils being able to deflect the electron beam 120 to a predetermined position by. The target area 162 is in FIG. 1A arranged on a movable object 160. The movable object 160 may move up and down relative to the surface 180 and also at least back and forth over the surface in at least one direction. The movable object may be a a powder distributor for distributing the powder material in the additive manufacturing machine. The target area may be arranged at a distance from the surface 180. The surface 180 may be a build area in the additive manufacturing machine or the area surrounding the build area, i.e., a powder table. For illuminating the surface 180 the target area 162 is irradiated by the electron beam. The target area may be made of a material having a melt point over 1000 C, for instance tungsten. Alternatively the target area 162 may be made of phosphorescent material or fluorescent material. In an alternative embodiment the target area may comprise different section of different types of material, e.g., a first area with fluorescent material a second area with phosphorescent material and a third area with wolfram. The different types of material my all be supported by one and the same support section, such as the powder distributor. In an alternative embodiment the different types of material are arranged on separate support objects, i.e., they are physically separated from each other. In various embodiment at least one target area is arranged on a movable support and at least one target area is arranged on a fixed support.

Figure 1B:
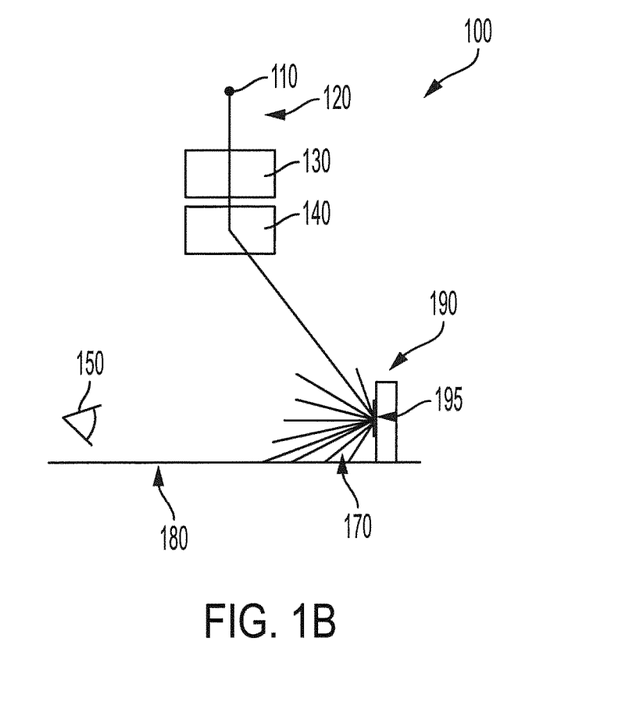

A detector 150 may be a camera or wavelength selective detector arranged so as to detect the surface 180. In FIG. 1A, the detector 150 is arranged above the target area 162. In FIG. 1B the detector is arranged at about the same height from the surface 180 as the target area and opposite to the target area 162. In FIG. 1B, a target area 195 is arranged on a fixed support 190 provided on the surface 180. In an alternative embodiment the surface 180 may be a calibration plate for calibrating the electron beam. The calibration plate may be fixed onto the powder table surrounding the build area. Alternatively, the calibration plate is a separate unit that is used prior to manufacturing and which may be removed when manufacturing takes place. In various embodiments the start plate 316 may be used as a calibration plate.

Figure 1C:
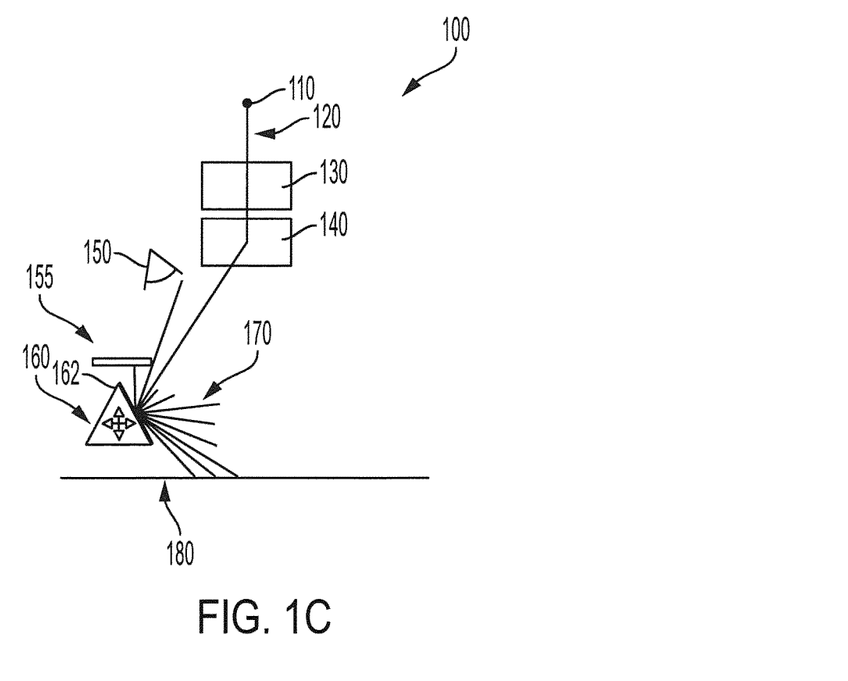

In FIG. 1C an optical blocker 155 is provided so as to block direct illumination from the target area 162 onto the detector 150. The detector may be out of sight from the target area either by arranging the detector so that no direct light from the target area may impinge into the detector, e.g., behind the target area, or by mans of the blocker 155.

Figure 1D:
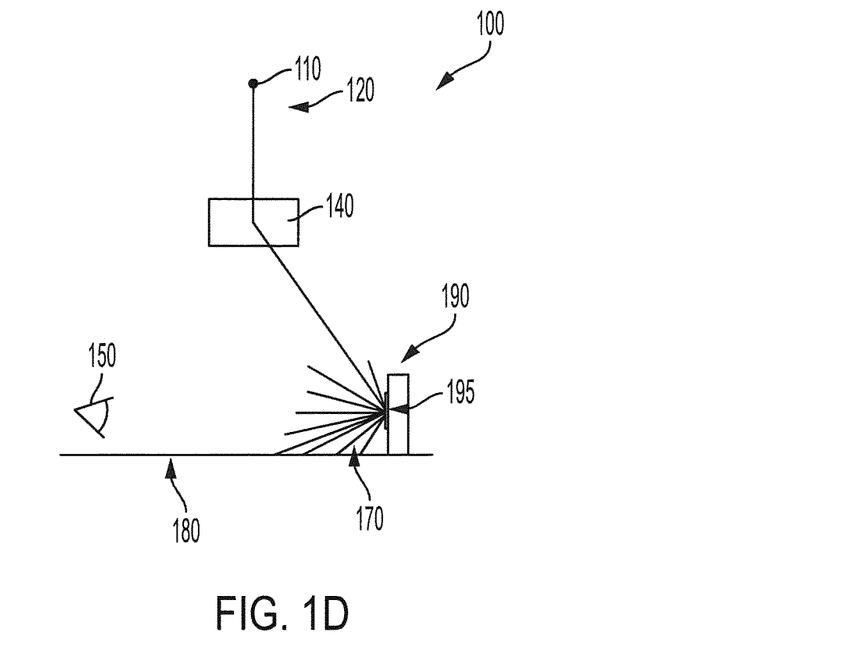

In FIG. 1D the electron beam is only deflected by the deflection arrangement without any beam shaping arrangement as in FIG. 1A-1C. The electron beam source as depicted in FIG. 1D may be suitable if a separate electron beam source is to be used for illumination generation and/or heating the powder material only, i.e., not for fusing the powder material.

Figure 1E:
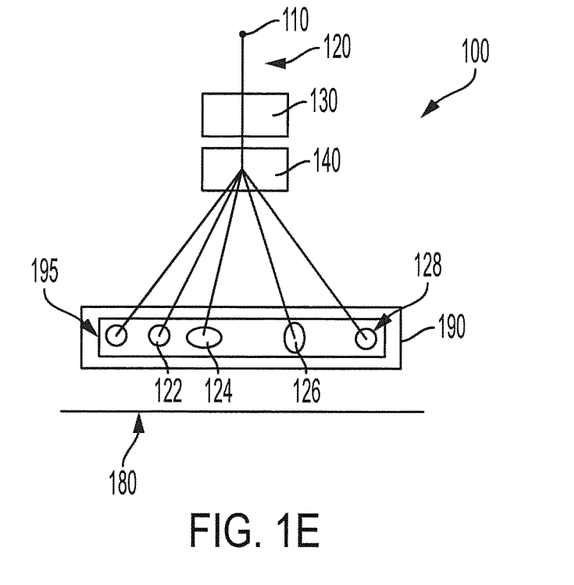
Figure 1F:
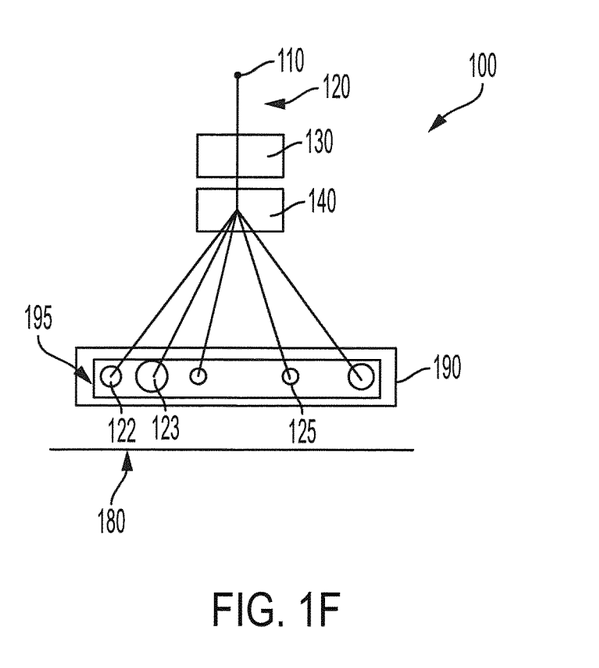

In FIG. 1E and FIG. 1F an illumination intensity and/or an illumination pattern may be regulated by altering the shape and/or the size of the beam with the beam shaping arrangement. In FIG. 1E a circular beam spot 122 onto the target area 195 may give rise to a first illumination pattern. A beam spot may be enlarged and expanded in a direction in parallel with the surface 180 as beam spot 124 or enlarged and expanded in a direction perpendicular to the surface 180 as beam spot 126. In FIG. 1F only the size of the beam spot onto the target area 195 is altered for altering the intensity of the illumination. Beam spot 125 may give rise to less intensity than beam spot 122 which in turn may give rise to less intensity than beam spot 123. Not only the size and shape of the beam spot onto the target area may affect the intensity of the illumination, there is also a time aspect of the illumination. Illumination generated by heat, as in case of heating up a target area made of for instance wolfram, the temperature of the target area also affect the illumination, i.e., the longer the beam spot is impinging onto a specific area the hotter the area will be and the more the area will illuminate. By scanning the electron beam over a larger area over and over again may also increase the illuminated target area and is a further means for altering the illumination. In FIGS. 1E and 1F the support surface is arranged at a distance from the surface 180. The support surface is fixed and may be fixed to the surface or to any other part inside an additive manufacturing apparatus.

Figure 1G:
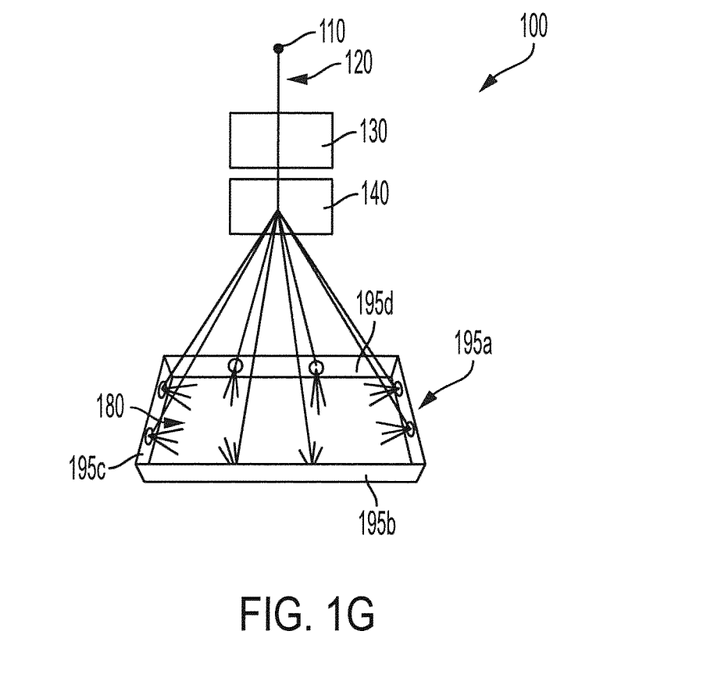

FIG. 1G depicts a further embodiment of an illumination device according to the present disclosure. In FIG. 1G there are four different target areas 195a, 195b, 195c and 195d. The four target areas 195a, 195b, 195c and 195d areas may provide illumination from four different directions when irradiated by at least one electron beam. An electron beam 120 may impinge onto a first target area 195a for providing illumination from a first direction, the electron beam 120 may impinge onto a second target area 195b for providing illumination in a second direction, the electron beam 120 may impinge onto a third target area 195c for providing illumination in a third direction and the electron beam 120 may impinge onto a fourth target area 195d for providing illumination in a fourth direction. In FIG. 1G only one electron beam source is used for irradiating all four areas. In various example embodiments two, three or more electron beam sources may be used for irradiating the target areas. In the exemplified embodiment the first and third illumination directions are opposite to each other and the second and fourth illumination directions are also opposite to each other. The individual target areas 195a, 195b, 195c and 195d may be attached to the surface 180 or to any other part inside the additive manufacturing apparatus. The target areas 195a, 195b, 195c and 195d are all illustrated to be rectangular shaped with flat surfaces onto which the electron beam is supposed to impinge for creating illumination. The flat surfaces are essentially perpendicular to the surface 180. In various embodiments the different target areas 195a, 195b, 195c and 195d may have different size and/or shape and may or may not be flat. In various embodiments the target area may have a surface which is not essentially perpendicular to the surface 180. The target areas may be convex shaped, concave shaped or saddle shaped as seen from the electron beam source.

By providing the electron beam 120 onto the different target areas in sequence a shadow free illumination may be generated. One may create different intensity from different directions by letting the electron beam impinge a certain target area a longer time compared to other target areas. The sequence of scanning the different target areas may be in a circular fashion, i.e., starting from the first target area 195a then to the second target area 195b going then to the third target area 195c and finally to the fourth target area 195d. An alternative illumination pattern may be to scan the target areas in a randomized pattern. If scanning the different target areas quick enough, i.e., irradiate all target areas within a predetermined time period, all the target areas will generate illumination simultaneously. A plurality of target areas may be arranged so as to create illumination in different directions which may be used for detecting a topography of the surface 180. A single camera may be used at a fixed position for capturing images of the surface 180 for topography detection. A first target area 195a may be illuminated for generating illumination in the first direction. The camera may be capturing a first image while the illumination may be generated in the first direction only. The electron beam then goes on to illuminate a second target area 195b and a second image may be captured while the second target area emanates illumination only. A third image may be captured while illumination may be generated from a third direction only and a forth image may be captured while illumination may be generated from the fourth direction only. These images may then be used for generating a topography map of the surface 180. At least two images may be needed while providing light from two different directions on order to generate a topography map of a surface. More images where illumination comes from more directions may increase the accuracy of the topography map. In FIG. 1G four different target areas are shown, in alternative embodiments 2, 3, 5 or more target areas may be used, where the target areas may be arranged in different patterns for creating a desired illumination of the surface in the additive manufacturing apparatus.

Figure 2:
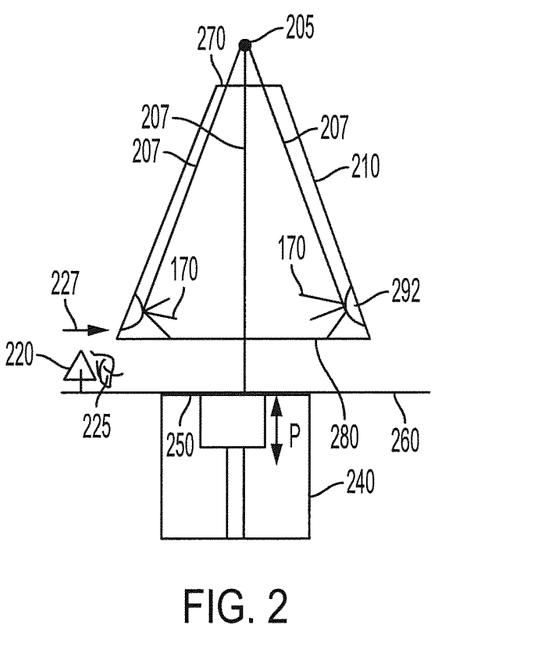
FIG. 2 depicts a schematic side view of yet another example embodiment of a device for providing illumination in an additive manufacturing apparatus according to the present application.

FIG. 2 depicts yet another example embodiment of an illumination device according to the present disclosure. Here we have an electron beam source 205 for generating an electron beam 207. The electron beam may be used for heating and/or fusing a powder material in a build area 250 of a build tank 240. A heat shield 210 is arranged between the electron beam source 205 and a powder table 260. The heat shield has an inlet 270 for receiving the electron beam 207 and an outlet 280 for allowing the electron beam to escape from the heat shield. When fusing the powder material in the build tank 240, the electron beam is not touching the heat shield. The heat shield may be arranged movable up and down. The heat shield provides for shielding the manufacturing process from the inner areas of a vacuum chamber, i.e., metal vapor will attach to the inside of the heat shield instead of the inside of the vacuum chamber and the heat shield also functions as preserving the heat close to the build area whereby less power may be needed in order to reach a predetermined temperature. The heat shield may be made of metal, one or a plurality of layers or an isolating material such as ceramic or any combination of metal layer and ceramic layers. In FIG. 2 the heat shield is in its up position allowing a powder distributor 220 with powder material 225 to pass under the heat shield 210. When the heat shield is in its down position the outlet portion of the heat shield may be very close to the powder table 260 or in contact with the powder table 260. The powder distributor 220 is moving in a direction indicated by arrow 227. Before the powder material is to be fused and/or after the powder material has been fused the electron beam 207 may be arranged to impinge onto one or a plurality of target areas 292 arranged inside the heat shield. The target areas may generate illumination for inspection the surfaces by means of the human eye and/or by means of one or a plurality of camera images with illumination generated from different directions.

One or a plurality of cameras (not shown) may be arranged so as to use the heat shield 210 as an optical blocker for illumination emanating directly from the target areas 292. A camera may for instance be arranged close to the powder table 260 allowing for capturing images of the build area 250.

In various example embodiments instead of using at least one electron beam source for melting the powder material and/or irradiating the target area at least one laser beam source may be used. The at least one laser beam source may in various example embodiment be used in combination with the at least one electron beam source. The laser beam source may be used for irradiating the target area only and/or for fusing and/or heating the powder layer for forming the three-dimensional article. In case of only using one or a plurality of laser beams for fusing the powder layer and irradiating the target area for creating illumination onto the powder layer and/or the top surface of the three-dimensional article the build chamber need not to be a vacuum chamber.

As mentioned, various embodiments of the present disclosure may be implemented in various ways, including as computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc (BD), any other non-transitory optical medium, and/or the like. Such a non-volatile computer-readable storage medium may also include read-only memory (ROM), programmable read-only memory (PROM), erasable programmable read only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory VRAM, cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like, as have been described elsewhere herein. As such, embodiments of the present disclosure may take the form of an apparatus, system, computing device, computing entity, and/or the like executing instructions stored on a computer-readable storage medium to perform certain steps or operations. However, embodiments of the present disclosure may also take the form of an entirely hardware embodiment performing certain steps or operations.

Various embodiments are described below with reference to block diagrams and flowchart illustrations of apparatuses, methods, systems, and computer program products. It should be understood that each block of any of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, could be implemented by special purpose hardware-based computer systems that perform the specified functions or operations, or combinations of special purpose hardware and computer instructions.

Figure 4:
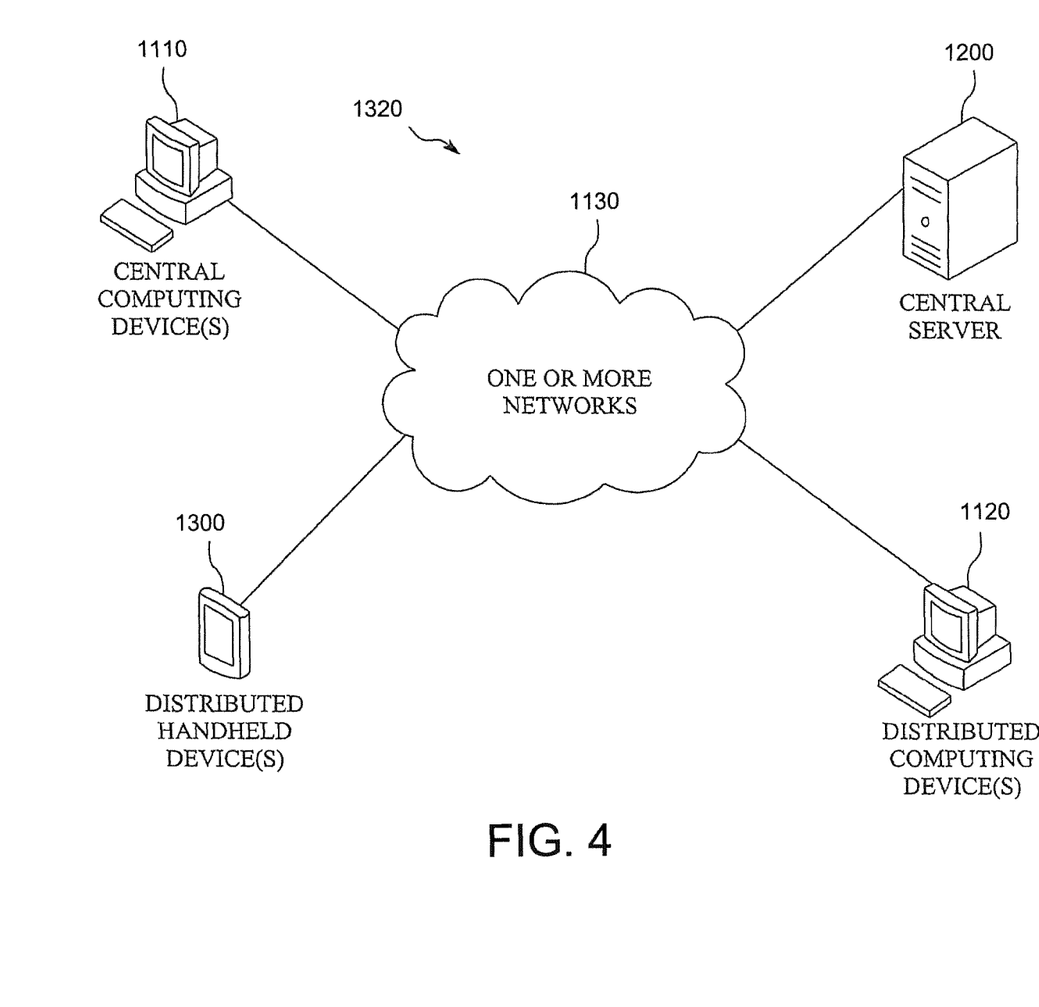
FIG. 4 is a block diagram of an exemplary system according to various embodiments.

FIG. 4 is a block diagram of an exemplary system 1320 that can be used in conjunction with various embodiments of the present disclosure. In at least the illustrated embodiment, the system 1320 may include one or more central computing devices 1110, one or more distributed computing devices 1120, and one or more distributed handheld or mobile devices 1300, all configured in communication with a central server 1200 (or control unit) via one or more networks 1130. While FIG. 4 illustrates the various system entities as separate, standalone entities, the various embodiments are not limited to this particular architecture.

According to various embodiments of the present disclosure, the one or more networks 1130 may be capable of supporting communication in accordance with any one or more of a number of second-generation (2G), 2.5G, third-generation (3G), and/or fourth-generation (4G) mobile communication protocols, or the like. More particularly, the one or more networks 130 may be capable of supporting communication in accordance with 2G wireless communication protocols IS-136 (TDMA), GSM, and IS-95 (CDMA). Also, for example, the one or more networks 1130 may be capable of supporting communication in accordance with 2.5G wireless communication protocols GPRS, Enhanced Data GSM Environment (EDGE), or the like. In addition, for example, the one or more networks 130 may be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present disclosure, as should dual or higher mode mobile stations (e.g., digital/analog or TDMA/CDMA/analog phones). As yet another example, each of the components of the system 1320 may be configured to communicate with one another in accordance with techniques such as, for example, radio frequency (RF), Bluetooth™, infrared (IrDA), or any of a number of different wired or wireless networking techniques, including a wired or wireless Personal Area Network ("PAN"), Local Area Network ("LAN"), Metropolitan Area Network ("MAN"), Wide Area Network ("WAN"), or the like.

Although the device(s) 1110-3100 are illustrated in FIG. 4 as communicating with one another over the same network 1130, these devices may likewise communicate over multiple, separate networks.

According to one embodiment, in addition to receiving data from the server 1200, the distributed devices 1110, 1120, and/or 1300 may be further configured to collect and transmit data on their own. In various embodiments, the devices 1110, 1120, and/or 1300 may be capable of receiving data via one or more input units or devices, such as a keypad, touchpad, barcode scanner, radio frequency identification (RFID) reader, interface card (e.g., modem, etc.) or receiver. The devices 1110, 1120, and/or 1300 may further be capable of storing data to one or more volatile or non-volatile memory modules, and outputting the data via one or more output units or devices, for example, by displaying data to the user operating the device, or by transmitting data, for example over the one or more networks 1130.

In various embodiments, the server 1200 includes various systems for performing one or more functions in accordance with various embodiments of the present disclosure, including those more particularly shown and described herein. It should be understood, however, that the server 1200 might include a variety of alternative devices for performing one or more like functions, without departing from the spirit and scope of the present disclosure. For example, at least a portion of the server 1200, in certain embodiments, may be located on the distributed device(s) 1110, 1120, and/or the handheld or mobile device(s) 1300, as may be desirable for particular applications. As will be described in further detail below, in at least one embodiment, the handheld or mobile device(s) 1300 may contain one or more mobile applications 1330 which may be configured so as to provide a user interface for communication with the server 1200, all as will be likewise described in further detail below.

Figure 5:
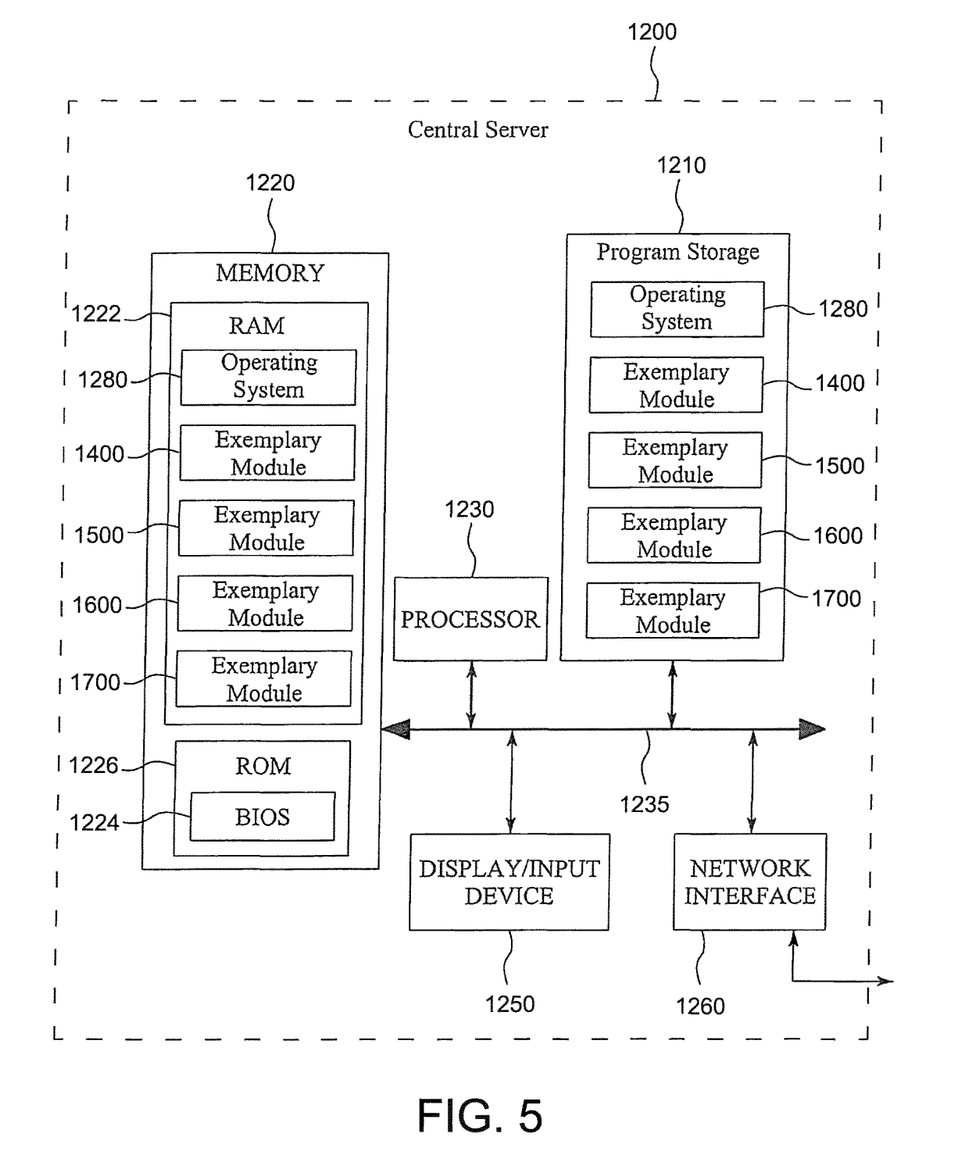
FIG. 5 is a schematic block diagram of an exemplary server according to various embodiments.

FIG. 5 is a schematic diagram of the server 1200 according to various embodiments. The server 1200 includes a processor 1230 that communicates with other elements within the server via a system interface or bus 1235. Also included in the server 1200 is a display/input device 1250 for receiving and displaying data. This display/input device 1250 may be, for example, a keyboard or pointing device that is used in combination with a monitor. The server 1200 further includes memory 1220, which typically includes both read only memory (ROM) 1226 and random access memory (RAM) 1222. The server's ROM 1226 is used to store a basic input/output system 1224 (BIOS), containing the basic routines that help to transfer information between elements within the server 1200. Various ROM and RAM configurations have been previously described herein.

In addition, the server 1200 includes at least one storage device or program storage 1210, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 1210 are connected to the system bus 1235 by an appropriate interface. The storage devices 1210 and their associated computer-readable media provide nonvolatile storage for a personal computer. As will be appreciated by one of ordinary skill in the art, the computer-readable media described above could be replaced by any other type of computer-readable media known in the art. Such media include, for example, magnetic cassettes, flash memory cards, digital video disks, and Bernoulli cartridges.

Although not shown, according to an embodiment, the storage device 1210 and/or memory of the server 1200 may further provide the functions of a data storage device, which may store historical and/or current delivery data and delivery conditions that may be accessed by the server 1200. In this regard, the storage device 1210 may comprise one or more databases. The term "database" refers to a structured collection of records or data that is stored in a computer system, such as via a relational database, hierarchical database, or network database and as such, should not be construed in a limiting fashion.

A number of program modules (e.g., exemplary modules 1400-1700) comprising, for example, one or more computer-readable program code portions executable by the processor 1230, may be stored by the various storage devices 1210 and within RAM 1222. Such program modules may also include an operating system 1280. In these and other embodiments, the various modules 1400, 1500, 1600, 1700 control certain aspects of the operation of the server 1200 with the assistance of the processor 1230 and operating system 1280. In still other embodiments, it should be understood that one or more additional and/or alternative modules may also be provided, without departing from the scope and nature of the present disclosure.

In various embodiments, the program modules 1400, 1500, 1600, 1700 are executed by the server 1200 and are configured to generate one or more graphical user interfaces, reports, instructions, and/or notifications/alerts, all accessible and/or transmittable to various users of the system 1320. In certain embodiments, the user interfaces, reports, instructions, and/or notifications/alerts may be accessible via one or more networks 1130, which may include the Internet or other feasible communications network, as previously discussed.

In various embodiments, it should also be understood that one or more of the modules 1400, 1500, 1600, 1700 may be alternatively and/or additionally (e.g., in duplicate) stored locally on one or more of the devices 1110, 1120, and/or 1300 and may be executed by one or more processors of the same. According to various embodiments, the modules 1400, 1500, 1600, 1700 may send data to, receive data from, and utilize data contained in one or more databases, which may be comprised of one or more separate, linked and/or networked databases.

Also located within the server 1200 is a network interface 1260 for interfacing and communicating with other elements of the one or more networks 1130. It will be appreciated by one of ordinary skill in the art that one or more of the server 1200 components may be located geographically remotely from other server components. Furthermore, one or more of the server 1200 components may be combined, and/or additional components performing functions described herein may also be included in the server.

While the foregoing describes a single processor 1230, as one of ordinary skill in the art will recognize, the server 1200 may comprise multiple processors operating in conjunction with one another to perform the functionality described herein. In addition to the memory 1220, the processor 1230 can also be connected to at least one interface or other means for displaying, transmitting and/or receiving data, content or the like. In this regard, the interface(s) can include at least one communication interface or other means for transmitting and/or receiving data, content or the like, as well as at least one user interface that can include a display and/or a user input interface, as will be described in further detail below. The user input interface, in turn, can comprise any of a number of devices allowing the entity to receive data from a user, such as a keypad, a touch display, a joystick or other input device.

Still further, while reference is made to the "server" 1200, as one of ordinary skill in the art will recognize, embodiments of the present disclosure are not limited to traditionally defined server architectures. Still further, the system of embodiments of the present disclosure is not limited to a single server, or similar network entity or mainframe computer system. Other similar architectures including one or more network entities operating in conjunction with one another to provide the functionality described herein may likewise be used without departing from the spirit and scope of embodiments of the present disclosure. For example, a mesh network of two or more personal computers (PCs), similar electronic devices, or handheld portable devices, collaborating with one another to provide the functionality described herein in association with the server 200 may likewise be used without departing from the spirit and scope of embodiments of the present disclosure.

According to various embodiments, many individual steps of a process may or may not be carried out utilizing the computer systems and/or servers described herein, and the degree of computer implementation may vary, as may be desirable and/or beneficial for one or more particular applications.

Figure 6:
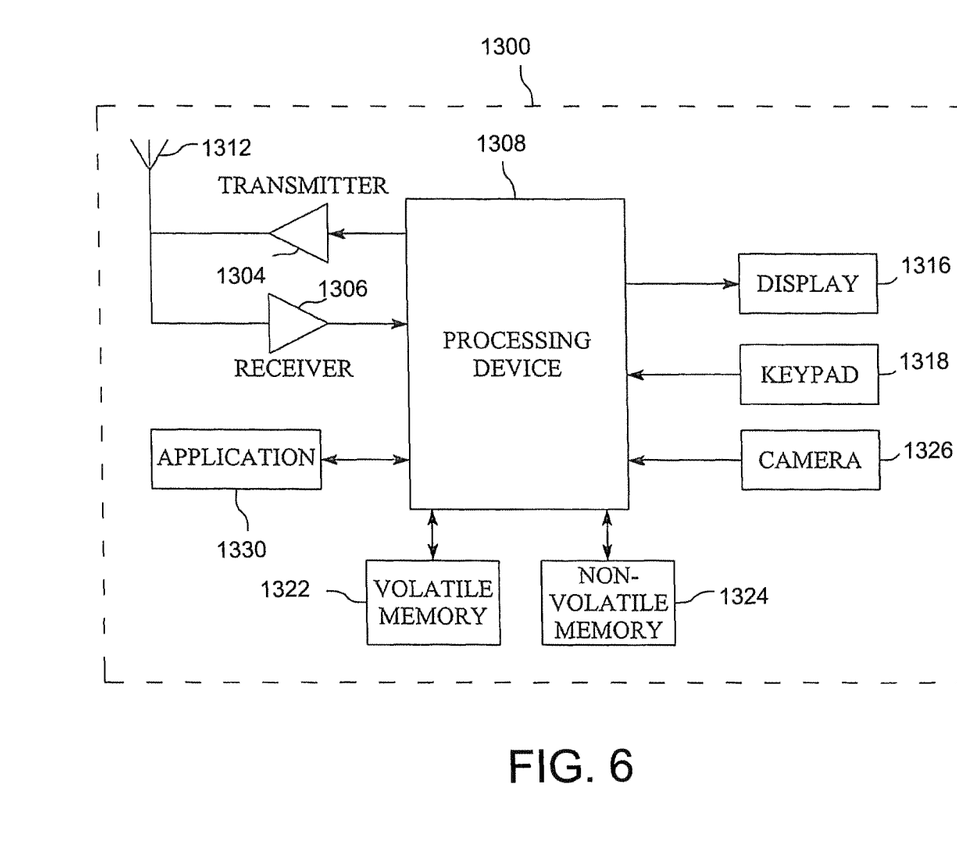
FIG. 6 is a schematic block diagram of an exemplary mobile device according to various embodiments.

FIG. 6 provides an illustrative schematic representative of a mobile device 1300 that can be used in conjunction with various embodiments of the present disclosure. Mobile devices 1300 can be operated by various parties. As shown in FIG. 6, a mobile device 1300 may include an antenna 1312, a transmitter 1304 (e.g., radio), a receiver 1306 (e.g., radio), and a processing element 1308 that provides signals to and receives signals from the transmitter 1304 and receiver 1306, respectively.

The signals provided to and received from the transmitter 1304 and the receiver 1306, respectively, may include signaling data in accordance with an air interface standard of applicable wireless systems to communicate with various entities, such as the server 1200, the distributed devices 1110, 1120, and/or the like. In this regard, the mobile device 1300 may be capable of operating with one or more air interface standards, communication protocols, modulation types, and access types. More particularly, the mobile device 1300 may operate in accordance with any of a number of wireless communication standards and protocols. In a particular embodiment, the mobile device 1300 may operate in accordance with multiple wireless communication standards and protocols, such as CPRS, UMTS, CDMA2000, 1xRTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the mobile device 1300 may according to various embodiments communicate with various other entities using concepts such as Unstructured Supplementary Service data (USSD), Short Message Service (SMS), Multimedia Messaging Service (MMS), Dual-Tone Multi-Frequency Signaling (DTMF), and/or Subscriber Identity Module Dialer (SIM dialer). The mobile device 300 can also download changes, add-ons, and updates, for instance, to its firmware, software (e.g., including executable instructions, applications, program modules), and operating system. According to one embodiment, the mobile device 1300 may include a location determining device and/or functionality. For example, the mobile device 1300 may include a GPS module adapted to acquire, for example, latitude, longitude, altitude, geocode, course, and/or speed data. In one embodiment, the GPS module acquires data, sometimes known as ephemeris data, by identifying the number of satellites in view and the relative positions of those satellites.

The mobile device 1300 may also comprise a user interface (that can include a display 1316 coupled to a processing element 1308) and/or a user input interface (coupled to a processing element 1308). The user input interface can comprise any of a number of devices allowing the mobile device 300 to receive data, such as a keypad 1318 (hard or soft), a touch display, voice or motion interfaces, or other input device. In embodiments including a keypad 1318, the keypad can include (or cause display of) the conventional numeric (0-9) and related keys (#, *), and other keys used for operating the mobile device 1300 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The mobile device 1300 can also include volatile storage or memory 1322 and/or non-volatile storage or memory 1324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONGS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non volatile storage or memory can store databases, database instances, database mapping systems, data, applications, programs, program modules, scripts, source code, object code, byte code, compiled code, interpreted code, machine code, executable instructions, and/or the like to implement the functions of the mobile device 1300.

The mobile device 1300 may also include one or more of a camera 1326 and a mobile application 1330. The camera 1326 may be configured according to various embodiments as an additional and/or alternative data collection feature, whereby one or more items may be read, stored, and/or transmitted by the mobile device 1300 via the camera. The mobile application 1330 may further provide a feature via which various tasks may be performed with the mobile device 1300. Various configurations may be provided, as may be desirable for one or more users of the mobile device 1300 and the system 1320 as a whole.

It is to be understood that the present disclosure is not limited to the embodiments described above and illustrated in the drawings; rather, the skilled person will recognize that many changes and modifications may be made within the scope of the appended claims.

The invention claimed is:

1. An apparatus for forming at least one three-dimensional article through successive fusion of parts of a powder bed, which parts corresponds to successive cross sections of the three-dimensional article, the apparatus comprising:
   a powder distributor configured for evenly distributing a layer of powder on top of a work table provided inside a build chamber; and
   at least one high energy beam source emanating at least one high energy beam configured for fusing the powder layer in selected locations corresponding to the cross section of the three-dimensional article, wherein:

the apparatus further comprises at least one target area arranged spaced apart from the layer of powder for emanating light when irradiated by the at least one high energy beam.

2. The apparatus of claim 1, wherein the target area is made of a phosphorescent material or a fluorescent material.

3. The apparatus of claim 1, wherein the target area is made of material having a melt point above 1000° C.

4. The apparatus of claim 1, wherein the target area is attached to the powder distributor or any other movable object.

5. The apparatus of claim 1, wherein the target area is attached inside of a heat shield provided between the powder layer and the at least one high energy beam source.

6. The apparatus of claim 1, wherein the target area is fixed to a powder table.

7. The apparatus of claim 1, further comprising at least one detector for detecting the light reflected by the layer of powder or the fused powder layer or a viewport for human viewing.

8. The apparatus of claim 1, further comprising an optical blocker for blocking light emanating directly from the target area onto a detector.

9. The apparatus of claim 1, further comprising means for altering the size of the beam when irradiating the target for altering the intensity of the light emanating from the target area.

10. The apparatus of claim 9, wherein the means is at least one focus coil or focus optics.

11. The apparatus of claim 1, wherein a first target area has a surface which is essentially flat.

12. The apparatus of claim 11, wherein the flat surface is essentially perpendicular to the powder layer.

13. The apparatus of claim 11, wherein a normal of the surface is building an angle which is 10-180.

14. A method for illuminating a powder layer and/or a top surface of a three dimensional article in an additive manufacturing machine when forming the three-dimensional article layer by layer by successive fusion of selected areas of powder layers with at least one high energy beam, which selected areas correspond to successive layers of the three-dimensional article, the method comprising the step of irradiating at least one of the at least one high energy beam onto a target area spaced apart from the layer of powder for emanating light from the target area onto the powder layer and/or the top surface of the three-dimensional article.

15. The method of claim 14, further comprising the step of altering the size of the beam onto the target area for altering an intensity of the light emanating from the target area.

16. The method of claim 14, further comprising the step of moving the target area while irradiating the target area.

17. The method of claim 14, further comprising the step of:

scanning the target area with the high energy beam in a predetermined pattern.

18. The method of claim 14, wherein the high energy beam is scanning a plurality of target areas arranged at different locations for creating a shadow free illumination.

19. The method of claim 14, further comprising the steps of:

capturing a first image with a camera while impinging the high energy beam onto a first target area arranged at a first position, and capturing a second image with a camera while impinging the high energy beam onto a second target area arranged at a second position, determining a topography of the powder and/or the top surface of the three-dimensional article by using information from the first and second images.

20. A control unit for controlling an additive manufacturing machine for illuminating a powder layer and/or a top surface of a three-dimensional article in the additive manufacturing machine when forming the three-dimensional article layer by layer by successive fusion of selected areas of powder layers, which selected areas correspond to successive layers of the three-dimensional article, the control unit is configured for providing at least one high energy beam onto a target area spaced apart from the layer of powder for emanating light from the target area onto the powder layer and/or the top surface of the three-dimensional article.

* * * * *